Jan. 28, 1964  R. E. DOEDEN  3,119,304
AIR OPERATED TOOL
Filed April 12, 1961
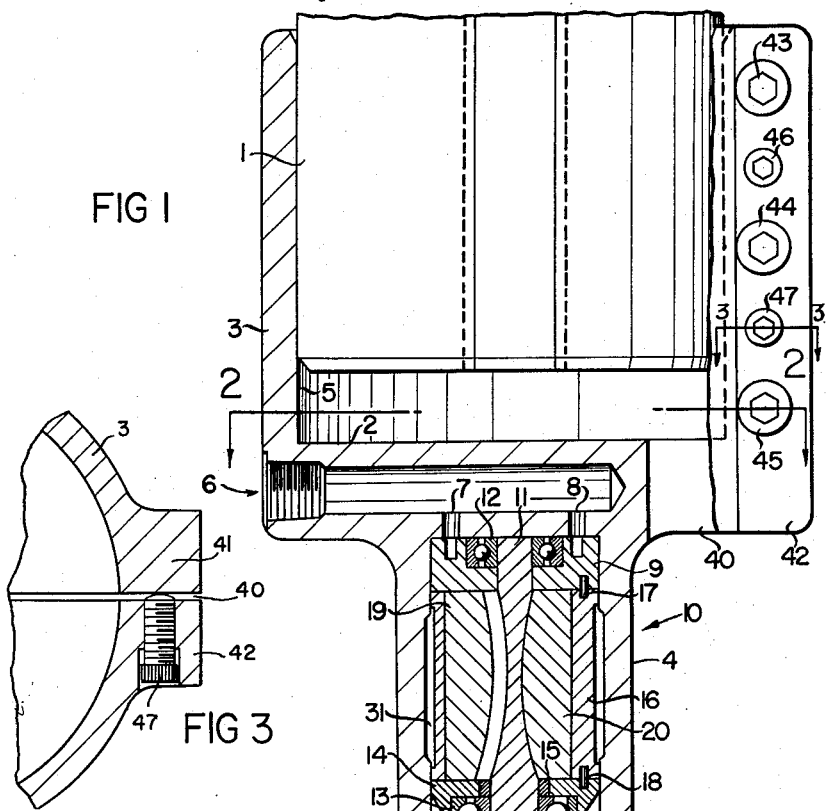
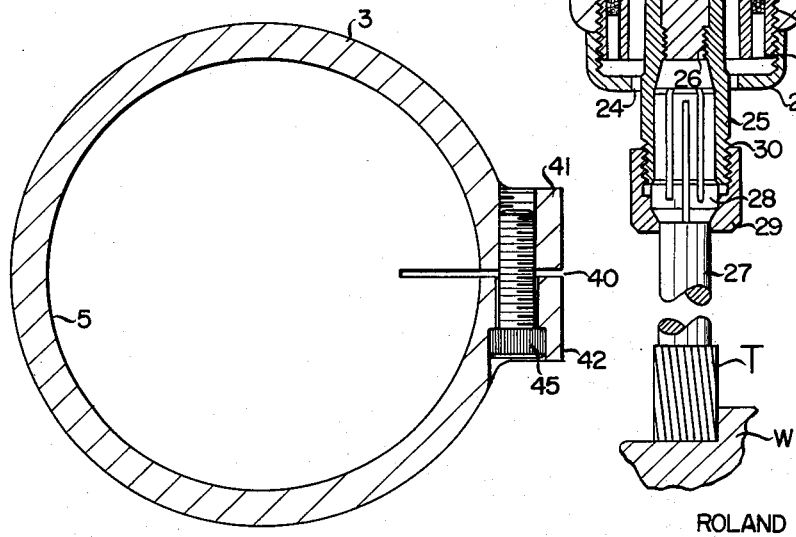
INVENTOR.
ROLAND E. DOEDEN
BY
Oberlin, Maky & Donnelly
ATTORNEYS United States Patent Office 3,119,304
Patented Jan. 28, 1964

3,119,304
AIR OPERATED TOOL
Roland E. Doeden, Ohio Rte. 18, Hicksville, Ohio
Filed Apr. 12, 1961, Ser. No. 102,492
3 Claims. (Cl. 90—11)

This invention relates generally, as indicated, to an air operated tool and more particularly to a machine tool attachment or accessory whereby higher cutting speeds may be obtained than through the normal use of the machine spindle.

In many milling machine operations, a higher tool speed than that available or offered by the milling machine is desirable. For example, in the milling of narrow width slots, it is desirable to have an extremely high tool r.p.m. Presently available milling machines do not provide a tool spindle speed of much greater than 10,000 r.p.m. if that, and for some operations it may be desirable to have a tool speed of from 25,000 to 30,000 r.p.m.

It is accordingly a principal object of the present invention to provide a machine tool attachment making available higher tool speeds than otherwise obtainable.

It is another important object to provide machine tool attachment which can be firmly and securely clamped thereto with very little spindle run-out.

It is another object to provide an air operated machine tool attachment providing extremely high tool speeds and utilizing the air exhaust for chip removal and work cooling.

It is a still further object to provide a machine tool attachment especially adapted for use with milling machines which can be clamped to the horizontal or vertically extending spindle sleeves or quills of such machine and which can be used with right angle drives for the desired flexibility of application.

It is yet another object to provide a machine tool attachment having a tool spindle driven by a high speed air motor, the housing of which is integrally formed with a clamp for securing such motor and spindle to a machine tool or the like.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a fragmentary sectional view of the air operated tool in accordance with the present invention;

FIG. 2 is a section taken substantially on the line 2—2 of FIG. 1; and

FIG. 3 is a sectional view taken substantially on the line 3—3 of FIG. 1.

The air operated tool shown in FIG. 1 in accordance with the present invention is mounted on the quill or spindle sleeve of a vertical milling machine. This spindle sleeve shown at 1 fits within a cylindrical cavity 2 formed in an enlargement 3 of the air operated tool housing 4. The bore 5 of the cavity 2 will be machined substantially to fit the specified diameter of the particular make of milling machine to which the tool is to be applied. Adjacent the bottom of the cavity 2 there is provided a transversely extending air inlet 6 to which a convenient source of air under pressure may be coupled. This transverse inlet communicates through passages 7 and 8 with the end plate 9 of an air motor shown generally at 10 within the reduced diameter portion of the housing 4. Such air motor is provided with a rotor 11 mounted in precision bearings 12 and 13. The bearings 12 are mounted in the end plate 9 and the bearings 13 are mounted in the end plate 14 and the shaft 11 is held from the end plate 14 by an annular spacer 15. A cylinder 16 held to the end plates by pins 17 and 18 encloses blades 19 and 20 which drive the rotor 11. The end of the reduced diameter portion of the housing 4 is internally threaded as shown at 21 and a lock ring 22 is threaded therein. Such lock ring is externally threaded to receive a guard or cap 23 having an opening 24 therein to accommodate the chuck 25 extending therethrough. Such chuck is threadedly secured to the rotor 11 as shown at 26. The shank 27 of a tool T may be secured within the chuck 25 by means of a collet 28 and hood or cap 29 threaded on the chuck 25 as shown at 30.

It can now be seen that air entering through inlet 6 will pass through passageways 7 and 8 into the interior of the stator or cylinder 16 and through suitable exhaust passages into the hollowed out portion 31 of the housing and then longitudinally through the end plate 14 into a porous sintered bronze ring 32 which acts as a muffler to silence the high pitched whistling or whine which would otherwise occur. From the muffler the air escapes between the chuck 25 and a lock ring 22 to pass outwardly through the opening 24 in the guard 23. In this manner, the exhaust air will be directed downwardly along the shank 27 of the tool T not only to remove chips from the work W, but also to provide a pronounced cooling effect upon the work.

The details of the particular air motor 10 are generally conventional and a reference may be had to my Patent Nos. 2,830,560 and 2,946,315 for a more clear disclosure of an air motor that may be employed with the present invention.

The enlarged portion 3 of the tool housing is provided with a longitudinally extending slot 40 and abutting flanges 41 and 42. Extending through such flanges are three socket head cap screws 43, 44 and 45. Such may be threaded to the flange 41, for example, while passing freely through the flange 42 so that they will exert a clamping force on the spindle sleeve 1 when tightened by causing the enlarged portion 3 of the housing to contract. Since the bore 5 may not be of exactly the right dimension to fit a specified diameter of a spindle sleeve of a milling machine, there is provided two socket head set screws 46 and 47 extending through the flange 42 to bear against the flange 41. In this manner, the cap screws 43, 44 and 45 may be loosened and the set screws 46 and 47 employed to enlarge the diameter of the bore 5 so that it will fit upon the desired size of quill or sleeve spindle 1. After the enlarged portion of the housing 3 is in place, the set screws may be loosened and the socket head cap screws employed to tighten and firmly clamp the air operated tool accessory in place. It will, of course, be understood that an angle drive attachment may readily be employed with the present invention, such angle drive attachment being clearly shown in my aforementioned Patents 2,830,560 and 2,946,315. With such angle drive attachment it will be possible to secure the illustrated air tool to a horizontally extending quill or spindle sleeve to perform the same operation as that shown in FIG. 1.

With the machine shown, it is possible to obtain very high precision with very small spindle run-out. Very powerful four blade rotary vane type air motors may be employed to obtain speeds of between 25,000 and 30,000 r.p.m. It will, of course, be possible to employ such accessory with a geared motor or reducer for drilling and slow speed milling.

By forming integrally the clamp with the motor housing and using the flexibility of the housing obtained through the slot 40, it is possible to ensure maximum rigidity and eliminate the play of the spindle if it were attached directly to the spindle of the milling machine. It will again be understood that the bore 5 may be of any desired diameter to fit particular models of milling machine required.

Whereas the accessory is shown applied to a milling machine, it will be understood that the tool is also useful with either carbide burrs or mounted grinding wheels to grind hardened parts, especially dies, jigs or fixtures.

It is noted that movement of the tool is obtained through the machine in the normal manner through movement of the spindle sleeve or quill 1. Also, the air inlet being on the enlarged portion of the housing makes it readily accessible for connection of an air pressure line.

It can now be seen that there is provided an air operated accessory for a machine tool whereby tool speeds can be obtained not otherwise obtainable with the machine tool.

Other modes of applying the principle of the invention may be employed, change being made as regards the details described, provided the features stated in any of the following claims or the equivalent of such be employed.

I, therefore, particularly point out and distinctly claim as my invention:

1. An air operated tool accessory for a machine tool and the like comprising a housing having a reduced diameter portion containing a rotor, a tool connected to said rotor, means to introduce air into said housing to drive said rotor and thus said tool at high speed, said housing including an enlarged portion having a bottomed cavity therein, a longitudinally extending slot in said enlarged portion of said housing, said slot extending through the outer edge of the bottom wall of said cavity, said housing terminating in abutting flanges adjacent said slot, and clamping screw means extending through said flanges adapted to contract the walls of said housing and thus the diameter of said cavity to clamp said housing on such machine tool.

2. An accessory for a machine tool and the like comprising a motor housing, a rotor in said motor housing, a tool connected to said rotor and adapted to be driven thereby, means to admit air under pressure to said housing to drive said rotor and thus said tool at high speed, said housing including an axially extending enlarged portion having an axially extending cavity therein, said enlarged portion of said housing being provided with a longitudinally extending slot, the walls of said housing terminating in abutting flanges adjacent said slot, clamping screw means extending through said flanges adapted to contract the walls of said housing and thus the diameter of said cavity to clamp said housing on such machine tool, and set screws adapted to spread the walls of said housing adjacent said slot to enlarge the diameter of said cavity.

3. The accessory set forth in claim 2 including an air inlet adjacent the bottom of said cavity in said enlarged portion of the housing communicating with said air motor in the reduced diameter portion of said housing.

References Cited in the file of this patent

UNITED STATES PATENTS

| | | |
|---|---|---|
| 1,221,472 | Rasmusen et al. | Apr. 3, 1917 |
| 1,244,090 | Hirth | Oct. 23, 1917 |
| 1,584,071 | Arnold | May 11, 1926 |
| 2,399,727 | Eklund | May 7, 1946 |
| 2,493,473 | Bouchard | Jan. 3, 1950 |
| 2,648,939 | Zelik et al. | Aug. 18, 1953 |
| 2,726,871 | Schnellmann | Dec. 13, 1955 |
| 2,753,617 | Felenchak | Jan. 10, 1956 |
| 2,780,966 | Frost et al. | Feb. 12, 1957 |
| 2,830,560 | Doeden | Apr. 15, 1958 |

FOREIGN PATENTS

| | | |
|---|---|---|
| 824,362 | Germany | Dec. 10, 1951 |